US006594495B2

(12) United States Patent
Salonaho et al.

(10) Patent No.: US 6,594,495 B2
(45) Date of Patent: *Jul. 15, 2003

(54) METHOD FOR LOAD CONTROL, AND RADIO SYSTEM

(75) Inventors: Oscar Salonaho, Helsinki (FI); Hannu Häkkinen, Espoo (FI); Seppo Granlund, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/970,551

(22) Filed: Oct. 3, 2001

(65) Prior Publication Data

US 2002/0034951 A1 Mar. 21, 2002

Related U.S. Application Data

(63) Continuation of application No. 09/117,110, filed as application No. PCT/FI97/00720 on Nov. 25, 1997, now Pat. No. 6,317,600.

(30) Foreign Application Priority Data

Nov. 26, 1996 (FI) .................................................. 964707

(51) Int. Cl.⁷ .................................................. H04Q 7/20
(52) U.S. Cl. ....................... 455/453; 455/501; 455/561; 455/226.3; 455/423
(58) Field of Search ................................ 455/560, 561, 455/453–455, 226.3, 434, 423–425; 370/229–238, 329

(56) References Cited

U.S. PATENT DOCUMENTS

| | | | | |
|---|---|---|---|---|
| 5,276,907 A | * | 1/1994 | Meidan | 455/436 |
| 5,379,448 A | * | 1/1995 | Ames et al. | 455/524 |
| 5,574,984 A | | 11/1996 | Reed et al. | 455/69 |
| 5,627,845 A | * | 5/1997 | Asano et al. | 714/795 |
| 5,799,154 A | * | 8/1998 | Kuriyan | 709/223 |
| 5,805,585 A | * | 9/1998 | Javitt et al. | 370/342 |
| 5,839,056 A | * | 11/1998 | Hakkinen | 455/69 |
| 5,889,768 A | * | 3/1999 | Storm et al. | 370/320 |
| 5,903,843 A | * | 5/1999 | Suzuki et al. | 455/452 |
| 5,953,661 A | * | 9/1999 | Schwinghammer et al. | 455/423 |
| 6,031,831 A | * | 2/2000 | Tan Boon et al. | 370/342 |
| 6,104,936 A | * | 8/2000 | Kronestedt | 455/562 |
| 6,317,600 B1 | * | 11/2001 | Salonaho et al. | 455/453 |

FOREIGN PATENT DOCUMENTS

| | | |
|---|---|---|
| WO | 0 652 650 | 5/1995 |
| WO | WO 96/02097 | 1/1996 |
| WO | WO96/22664 * | 7/1996 |
| WO | WO 97/13334 | 4/1997 |

OTHER PUBLICATIONS

Copy of the International Search Report for PCT/FI97/00720.

* cited by examiner

*Primary Examiner*—Edward F. Urban
*Assistant Examiner*—Charles Craver
(74) *Attorney, Agent, or Firm*—Squire Sanders & Dempsey LLP

(57) ABSTRACT

The invention relates to a method for load control and a radio system. In the invention a load result describing the load is cell-specifically formed. The load result is formed either by comparing a signal strength of desired signals and a combined total strength of interferences and the desired signals or by weighting a signal-to-interference ratio with a bandwidth or a data transmission rate. The load result is compared with a threshold value of the highest load level allowed of a cell. The data transmission rate in the cell is increased if the load result is smaller than the threshold value. The data transmission rate in the cell is reduced and the establishment of new connections is avoided if the load result exceeds the threshold value. In heavy load situations a signal-to-interference objective is also changed in order to balance the load result.

18 Claims, 2 Drawing Sheets

METHOD FOR LOAD CONTROL, AND RADIO SYSTEM

This application is a continuation of application Ser. No. 09/117110, filed Oct. 10, 1998 now U.S. Pat. No. 6,317,600, which is a 371 of PCT/FI97/00720, filed Nov. 25, 1997. The application is incorporated herein by reference.

FIELD OF THE INVENTION

The invention relates to a method for load control, the method being used in a radio system comprising at least one base station and a subscriber terminal which communicate with each other by transmitting and receiving signals representing desired signals and interferences.

The invention further relates to a method for load control, the method being used in a digital radio system comprising at least one base station and a subscriber terminal which communicate with each other by transmitting and receiving signals which are desired signals and/or interferences.

The invention also relates to a radio system comprising at least one base station and a subscriber terminal which comprise at least one transceiver and which are arranged to communicate with one another by transmitting and receiving signals which are desired signals and/or interferences.

The invention further relates to a radio system comprising at least one base station and a subscriber terminal which comprise at least one transceiver and which are arranged to communicate with one another by transmitting and receiving signals which are desired signals and/or interferences.

BACKGROUND OF THE INVENTION

The invention is applied to interference limited cellular radio systems and particularly to a CDMA system. In the CDMA technique the user's narrowband data signal is modulated by a spreading code, which is more wideband than the data signal, to a comparatively wide band. In the methods, bandwidths from 1 to 50 MHz have been used. The spreading code is conventionally formed from a long pseudo-random bit sequence. The bit rate of the spreading code is much higher than that of the data signal. In order to distinguish spreading code bits from data bits and symbols comprising bits and combinations of bits, the spreading code bits are called chips. Each user data symbol is multiplied by the spreading code chips. Then the narrowband data signal spreads to the frequency band used by the spreading code. Each user has his/her own spreading code. Several users transmit simultaneously on the same frequency band and the data signals are distinguished from one another in the receivers on the basis of a pseudo-random spreading code.

The capacity of interference limited multiple access systems such as the CDMA cellular radio system is determined by an interference power caused by users. In such a system the subscriber terminal usually establishes a connection with the base station to which the path loss is the smallest. The base station coverage does not in all situations correspond to the traffic need, but the load of some base stations increases to such an extent that the connections to the subscriber terminals can be disconnected either due to the increased interference or to the inadequacy of the transmission capacity.

It is assumed in prior art handover and power regulation algorithms that a connection is established with the base station to which the path loss is the smallest. Such a best connection principle is thus preferable, as the traffic load towards the base station is constant or when the signal-to-interference ratio of the most loaded base station meets the minimum requirement. But when the load of a base station increases to such an extent that the minimum requirements of the connection quality cannot be met, a way is needed to balance the load. A prior art radio system does not, however, allow load management that balances the load, but prior art systems easily lead to an unstable situation, in which disconnecting the connection to some subscriber terminals is the only possibility. Such heavy load situations, in which the connection quality declines below the minimum requirements and which can thus be called overload situations, are not desired.

In the interference limited radio systems it is of primary importance to keep the load sufficiently low, because otherwise owing to fast power control the transmitters increase their power to the maximum. At worst this, in turn, could lead to the disconnecting of most radio system connections. Then again, it is appropriate to handle simultaneously as many connections as possible.

SUMMARY OF THE INVENTION

An object of the present invention is to implement a method and a radio system applying the method, in which a load can be optimally controlled at a connection and/or cell level, and thus prevent overload situations and improve the connection quality in a normal situation. Another object of the invention is also to enable large data transmissions using the highest possible data rate.

This is achieved with the method of the type set forth in the preamble characterized by forming a combined signal strength of one or more desired signals; forming a combined total strength of the interferences and one or more desired signals; forming a load result measuring the load by comparing the signal strength and the total strength; comparing the load result with a threshold value, which is a predetermined measure for the highest load level allowed, whereby, when the load result and the threshold value substantially differ from one another, the load is balanced by changing the telecommunication rate.

The method of the invention is further characterized by forming signal-specifically one or more desired signal-to-interference ratios; forming a combined load result of the signals by proportioning one or more desired signal-to-interference ratios with corresponding signal bandwidths and data transmission rates; comparing the load result with a threshold value, which is a predetermined measure for the highest load level allowed, whereby, when the load result and the threshold result substantially differ from one another, the load is balanced by changing the telecommunication rate.

The radio system of the invention is characterized by comprising signal means to form a signal strength of one or more desired signals; total strength means to form a combined total strength for both interferences and one or more desired signals; comparing means to form a load result by comparing the signal strength and the total strength; threshold means to compare the load result with a threshold value, which is a predetermined measure for the highest load level allowed, and when the load result and the threshold value substantially differ from one another on the basis of the comparison, the radio system is arranged to balance the load by changing the telecommunication rate.

The radio system of the invention is further characterized by comprising signal-to-interference ratio means in which one or more desired signal-to-interference ratios are signal-specifically stored; frequency band means in which information on a bandwidth of one or more signals is stored; data transmission rate means which are arranged to form information on a data transmission rate of one or more signals; multiplication means which are arranged to form a load result by proportioning said desired signal-to-interference ratio with said signal bandwidth and data transmission rate; threshold means to compare the load result with a threshold value, which is a predetermined measure for the highest load result allowed, and when the load result and threshold value substantially differ from one another on the basis of the comparison, the radio system is arranged to balance the load by changing the telecommunication rate.

Great advantages are achieved with the method of the invention. The overload situations of an interference limited radio system can be avoided and the load can be optimally controlled. In addition, unstable situations and connection cut-offs can be avoided at the same time as a maximum bit rate can be used in relation to each situation.

BRIEF DESCRIPTION OF THE DRAWINGS

In the following the invention will be described in greater detail with reference to examples in the accompanying drawings, in which.

DETAILED DESCRIPTION OF THE PREFERRED EMBODIMENTS

Figure 1:
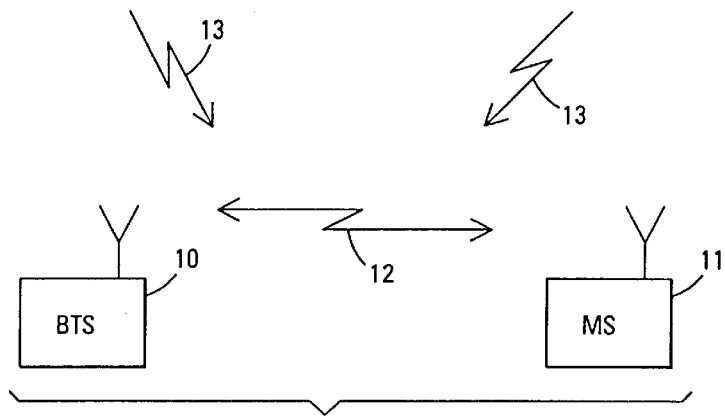
FIG. 1 shows communication between two transceivers.

The method of the invention can be applied to interference limited radio systems such as a CDMA system without restricting thereto.

Let us now examine in more detail the theoretical basis of the invention. In the CDMA system a signal-to-interference ratio SIR can be determined for each connection i as follows:

$$SIR_i = P_{gain,i} \frac{P_{rx,i}}{P_{int,i}}, \quad (1)$$

where i is a connection index, $P_{rx,i}$ is a combined strength for a received desired signal and an interfering signal, $P_{int,i}$ is a total interference strength and gain $P_{gain,i}$ is defined $$P_{gain,i} = \frac{BW}{DS},$$

where BW is a bandwidth and DS is a data transmission rate. Each signal is both a possible desired signal and an interfering signal, since the signals interfere with one another. A signal strength is preferably measured as a signal power without restricting thereto, since the solution of the invention also operates by applying another parameter describing the signal strength. The data transmission rate DS is measured, for example, as bits per second. The bandwidth BW is the bandwidth the receiver employs for a radio-frequency signal. What is meant by a connection is the connection between a subscriber terminal and a base station, the connection usually being established for a call or a data transmission. In a typical radio system the subscriber terminal is preferably a mobile phone.

When $P_{gain,i}$ in formula (1) is divided into the left side of the formula and a sum of a signal and an interference of all connections i is formed, and $$L = \sum_i \frac{SIR_i}{P_{gain,i}} = \sum_i \frac{P_{rx,i}}{P_{int,i}}, \quad (2)$$

is obtained, where L is a load. In the CDMA system a total interference is formed from other signals than precisely the desired signal (desired signals) and from a constant interference caused by other electromagnetic radiation on said frequency band and, for example, from the transceivers thermal noise. The desired signal means the received signal which is to be detected. Other signals cause interference and are thus interferences. In this way formula (2) can be converted into mode:

$$L = \sum_i \frac{SIR_i}{P_{gain,i}} = \sum_i \frac{P_{rx,i}}{P_{int,i}} = \frac{\sum_i P_{rx,i}}{\sum_i P_{rx,i} + I}, \quad (3)$$

where $$\frac{\sum_i P_{rx,i}}{\sum_i P_{rx,i} + I} \to 1, \quad \text{when} \sum_i P_{rx,i} \to \infty.$$

In formula (3) I is a total interference comprising the receivers noise, pilot signal interferences and the interference caused by other cells. $P_{rx}$ ja I depend upon each other to the effect that, when transmitted powers are increased in order to enlarge power $P_{rx}$, several parts of interference I also increase, as the signals of $P_{rx}$ interfere, for example, with the neighbouring cell in which the powers to be used are increased. Formula (3) shows that irrespective of how high the strength of the received signal $$\sum_i P_{rx,i}$$

grows, the left side of formula (2) stays smaller than 1. The results of formula (3) are directly valid at an antenna but the results have to be proportioned to the efficiency of interference cancellation when IC or MUD (Interference Cancellation, Multi-User Detection) methods are used in reception, as interference cancellation reduces the mutual interference of the signals. If, for example, the MUD method reduces interference to a fifth, the limit value becomes fivefold, or 5. Based on this information the solutions of the invention can be implemented. The closer the value 1 the result of formula (2) is, the higher the load L of the receiver is. It is not worthwhile to let the load L grow too high, instead it should be aimed to keep the load L sufficiently below the threshold value result 1.

Figure 2:
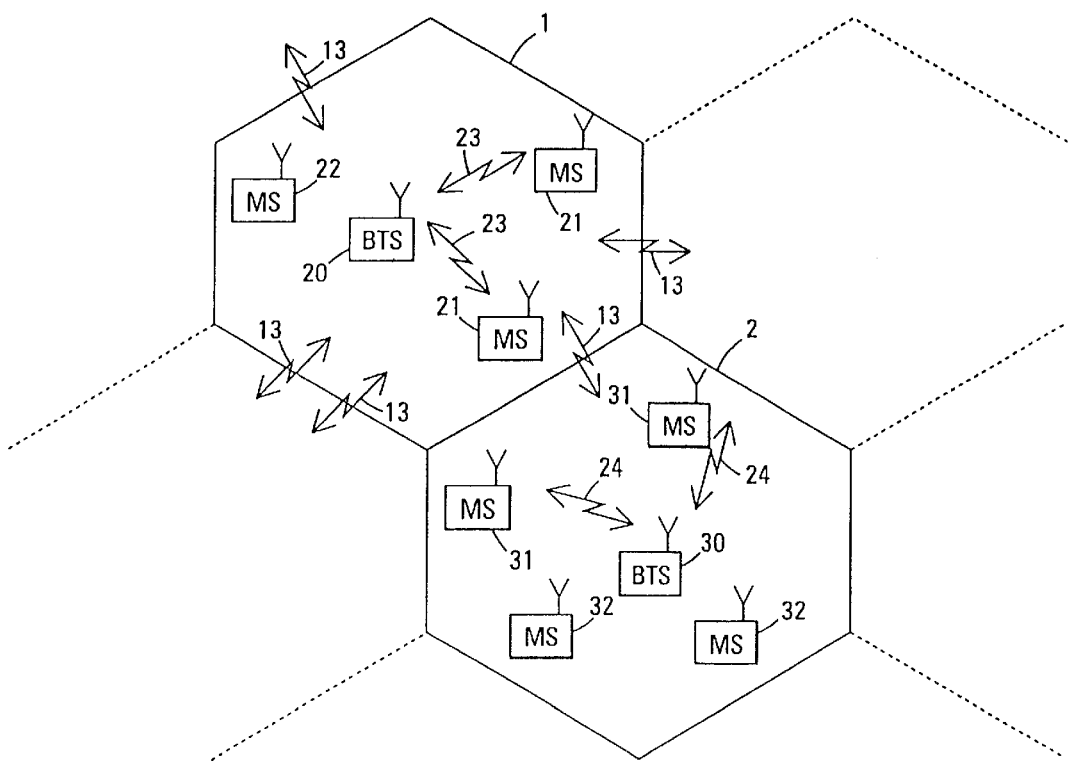
FIG. 2 shows a cellular radio system.

Let us now examine in greater detail the method of the invention utilizing FIGS. 1 and 2. The situation in FIG. 1 comprises transceivers 10 and 11, a bi-directional communication with a desired signal 12 and interferences 13. The transceiver 10 is, for example, a base station and the transceiver 11 is a subscriber terminal. When the subscriber terminal 11 transmits its own signal 12, or the desired signal, to the base station 10, the base station 10 receives the desired signal 12, but simultaneously the base station 10 receives the interferences 13, which interfere with the detection of the desired signal 12. In order to improve the quality of the desired signal 12 and to ensure the detection, the base station 10 transmits a command to the subscriber terminal 11 concerning the change of the data transmission rate. As the interferences 13 interfere with the connection 12 the command preferably comprises information on reducing the data transmission rate. After acknowledging the command both the base station 10 and the subscriber terminal 11 use the reduced data transmission rate, which improve the interference tolerance of both receivers 10 and 11.

The method of the invention thus operates in more general terms as follows. A signal strength $P_{rx}$ of one or more desired signals 12 is formed and similarly a combined total strength $P_{rx}+I$ of the interferences 13 and the desired signal 12 is also formed. By comparing the signal strength $P_{rx}$ to the total strength $P_{rx}+I$, whereby a load result L is formed, and by further comparing the load result thus formed to a predetermined threshold value $K_t$, or to the load goal, measures are taken, if required, to balance the load. The comparison can be performed, for example, by dividing or calculating the difference. If the load L is substantially more than what is allowed according to the threshold value $K_t$, or in accordance with formula (3)

$$L = \frac{\sum_i P_{rx,i}}{\sum_i P_{rx,i} + I} > K_t, \tag{4}$$

where $K_t$ is a predetermined threshold value, the load L is reduced preferably by decreasing the data transmission rate of the desired signal. If again the load L is substantially less than what is allowed by the threshold value $K_t$, or according to formula (3)

$$L = \frac{\sum_i P_{rx,i}}{\sum_i P_{rx,i} + I} < K_t, \tag{5}$$

the data transmission rate of the desired signal 12, or generally of any signal, can be increased. Thus, according to the method of the invention, which can particularly be applied to the base station, the load L is kept constant.

FIG. 2 illustrates the solution of the invention in a cellular radio system. The cellular radio system comprises cells 1 and 2. The cell 1 comprises a base station 20 and subscriber terminals 21 and 22. The subscriber terminals 21 and 22 are preferably mobile phones. The subscriber terminals 21 communicate with the base station 20 in the cell 1. The subscriber terminal 22 does not communicate with anything in the situation of this example. The desired signals of the cell 1 are signals 23 as they represent traffic within the cell 1. The same signals 23 also represent interference within the cell as the desired signals 23 interfere with one another. Signals of other cells arrive at the cell 1 from outside, the signals being interferences 13 in the cell 1. In the cell 1 interferences I are also represented by other electromagnetic radiation on the frequency band of the desired signals interfering with the desired signals 23 and by the noise of the receiver. In the method of the invention the relations between the interferences 13 and 23 and the desired signals 23 are to be kept in balance and the threshold value $K_t$ of the relation between the interferences 13 and the desired signals 23 is to be predetermined, on the basis of which threshold value the data transmission rate of the desired signals is either increased or reduced. Then the load L of the receiver increases or decreases. In the cell 1 the combined signal strength $P_{rx}$ of the desired signals 23 is summed or otherwise correspondingly formed. Furthermore, the combined total strength $P_{rx}+I$ of the interferences 13 and the desired signals 23 is similarly formed. By comparing the signal strength $P_{rx}$ to the total strength $P_{rx}+I$, whereby the load result L is obtained, and by further comparing the load result L thus formed to the predetermined threshold value $K_t$ measures are taken, if required, in the cell 1 to balance the load L. The comparison can be performed, for example, by dividing or calculating the difference. If the load L substantially exceeds what is allowed according to the threshold value $K_t$ in accordance with formula (4), the effect of the interferences 13 and 23 on the desired signals 23 of the cell is reduced preferably by decreasing the data transmission rate of the desired signals 23. At this time new connections are not preferably established either, before the load situation has changed in such a way that there is less load L than what is allowed according to the threshold value $K_t$, since the new connections would further increase the load.

If again the load L is substantially less than what is allowed according to the threshold value $K_t$ in accordance with formula (5), the data transmission rate of the desired signals 23 can be increased. The relation between the strengths $P_{rx}$ of the desired signals 23 and the combined strengths $P_{rx}+I$ of both the interferences 13 and the desired signals 23 is aimed to keep constantly stable in the cell 1.

In the second method of the invention the effect of the data transmission rate change on the load L can more clearly be concluded. In this method a signal-to-interference ratio $SIR_i$ of each connection i is given a connection-specific desired value $SIR_{i,t}$ in formula (3) and in order to calculate the load L it is proportioned by the bandwidth BW and the data transmission rate DS. Thus, the aim is to keep formula (6) continuously valid for the connections i $$L \leq \sum_i DS_i * \frac{SIR_{i,t}}{BW} = 1 - \varepsilon = K_t, \tag{6}$$

where $1-\varepsilon$ is a load objective, or a threshold value load $K_t$. The load situation is most preferable when the load L corresponds to the desired threshold value $K_t$, whereby $L=K_t$. The signal-to-interference ratio $SIR_{i,t}$ is preferably formed using filtering to the effect that it is a moving average value of the measured signal-to-interference ratios SIR, for example, a mean. Since $SIR_{i,t}$ changes slowly, by changing the data transmission rate in a variable $P_{gain,i}$ the load L also changes in an easily predictable way. The parameter $\varepsilon$ can be constant or variable and its value should be between figures 0 and 1. Typically the value of the parameter $\varepsilon$ can be, for example, 0.5. The value of the desired signal-to-interference ratio $SIR_{i,t}$ thus depends on the connection and the cell and therefore the value of $SIR_{i,t}$ has to be adapted according to the situation. For example, the base station preferably measures, when operating, the signal-to-interference ratios SIR repeatedly. Then the load result L is regularly formed, for example, at 20 ms intervals. A bit-error-rate BER, a signal-to-noise ratio S/N or equivalent can be used as a measure of the signal-to-interference ratio SIR in the solution of the invention.

The strengths of the signals and interferences can be determined in the method of the invention from the signals' instantaneous or long-term statistical effective values or from other equivalent values. In the method of the invention the data transmission rate is reduced preferably in the connections that have the highest energy per transmitted symbol, or usually per bit. This facilitates the detection in difficult circumstances. The data transmission rate is, in turn, increased cell-specifically preferably in the connections that have the smallest energy per transmitted symbol, or usually per bit. Thus, an optimally fast data transmission rate is obtained in respect of the interferences.

As $SIR_i$ also represents, for example, in formula (6) a signal interference objective aimed at, in addition to changing the data transmission rate in the method of the invention the load can be balanced also by changing the signal-to-interference ratio $SIR_i$ objective. Such an operation is advantageous, for example, in heavily loaded circumstances, when more interference has to be accepted than usually.

In addition to changing the data transmission rate and the signal-to-interference ratio objectives, the establishment of new connections is also controlled in the inventive method. Then a new connection to be established particularly increases the load of the base station, hence the new connection is allowed to be established in the method of the invention only if the load L remains smaller than the highest possible load.

Let us now examine in more detail the establishment of the new connection in an up-link direction in a typical radio system. The base station calculates an up-link load $L_{up}$ using formula (6). The base station also calculates an estimated load situation $L_{new,\ up}$ for the new connection $$L_{new,up} = L_{up} + Ds_i * \frac{SIR_{t,up}}{BW}, \quad (7)$$

The base station also calculates continuously, regularly or irregularly a standard deviation, a variance or equivalent $Std_L$. of the load L, which it utilises when forming the threshold value $K_t$ of the load. The threshold value $K_t$ of the load is of the same kind in formulas (4) and (5) but the effect of uncontrolled new connections on the load situation is preferably also taken into account. If an estimated load $L_{new,\ up}$ is smaller than a threshold value $K_t$ a connection can be established. Otherwise a new connection is not established. In other words, when formula (8) is valid the connection is established:

$$L_{new,\ up} < K_t = 1 - \epsilon - M * std_L + margin_{ho}, \quad (8)$$

where M is a freely chosen parameter (typically M=5) and $margin_{ho}$ is a handover parameter (typically 0.05 when handover is performed, 0 for a new beginning connection), which is meant to prioritise a new handover connection. The load of uncontrolled connections can be taken into account by reducing the threshold value $K_t$ by an amount based on standard deviation $std_L$, and thus aiming to leave reserve space for a new connection.

In a down-link direction the establishment of a connection is controlled similarly as in the up-link direction. If the estimated load $L_{new,\ up}$ is smaller than the threshold value $K_t$, the connection can be established. Otherwise a new connection is not established. In other words, when formula (8) is valid the connection is established. In addition, the total strength $P_{tot}$ of the signal transmitted by the base station preferably has to be smaller than the threshold value $P_{th}$ of the strength. The total value $P_{tot}$ of the strength comprises at least a real desired signal strength $P_s$ and preferably also a pilot signal strength $P_p$ associated with the desired signal. In formula mode this can be shown as follows: $P_{th} > P_s + P_p = P_{tot}$. The strengths of the desired signal and the pilot signal are preferably effective values.

Figure 3:
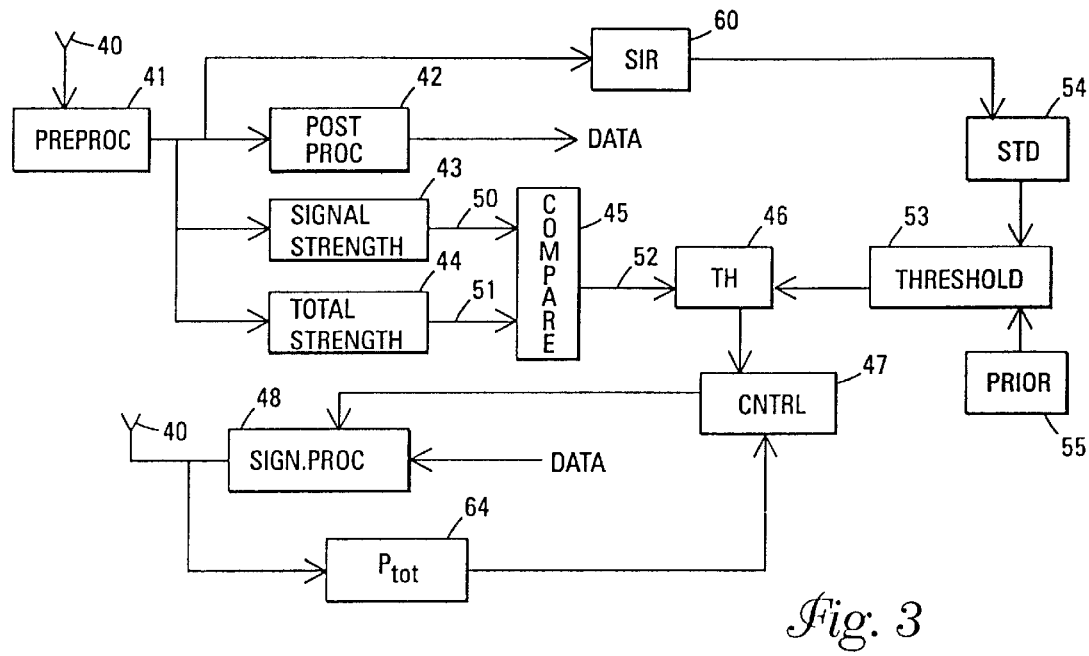
FIG. 3 shows a transceiver and FIG. 4 shows a second transceiver solution of the invention.

FIG. 3 illustrates the solution of the invention which can preferably be located at the base station and the base station controller of the radio system. The transceiver comprises an antenna 40, signal pre-processing means 41, post-processing means 42, signal means 43, total strength means 44, comparing means 45, threshold means 46, control means 47, transmission means 48, threshold value means 53, in which a threshold value is stored, means 54 to calculate standard deviation, means 55 to prioritize the subscriber terminal performing handover, signal-to-interference ratio means 60 and measuring means for total signal strength 64. The radio-frequency transmission received by the antenna 40 typically comprises signals from various transmitters which function as sources for both the desired signals 23 and the interferences 13. The combined signal combination of the interferences 13 and the desired signals 23 propagates from the antenna 40 to the pre-processing means 41 comprising, for example, radio frequency means and a filter (not shown in the Figure). The radio frequency means and the filter calculate the frequency of the received signal combination preferably for the intermediate frequency. The signal combination can also be handled by the pre-processing means 41 analogically and/or digitally. The post-processing means 42 comprise signal processing means which are needed, for example, at the base station of the radio system, but the function or structure of the post-processing means 42 is not important in terms of the invention.

The substantial structures concerning the invention are means 43–45 which implement the method of the invention. A combined signal strength 50 of the desired signals 23 of the cell 1 is formed in the signal means 43. A total strength 51 of both the desired signals and the interferences 13 is formed in the total strength means 44. By proportioning the strengths to one another to a load result 52 in the means 45 and by comparing the result 52 to a predetermined threshold value 53 in threshold means 46, the threshold means 46 can inform control means 47 whether a change in data transmission rate is needed. The control means 47 transmit, if necessary, in connection with the change command of the data transmission rate to other parties involved (subscriber terminals) by transferring the change command to a modulator 48 and onwards to the antenna 40. The control means 47 can also change the transmitter's transmission rate by controlling the transmission modulator 48 to the effect that the data transmission rate changes. Using means 54 and 55 the magnitude of a threshold value 53 is changed according to the method of the invention. Means 40, 41, 42, 43, 44, 48 and 64 are conventionally located at the subscriber terminal or the base station. Means 45 and 60 are usually located at the base station and means 46, 47, 53, 54 and 55 are usually located at the base station or the base station controller. However, the location is unessential for the invention.

Figure 4:
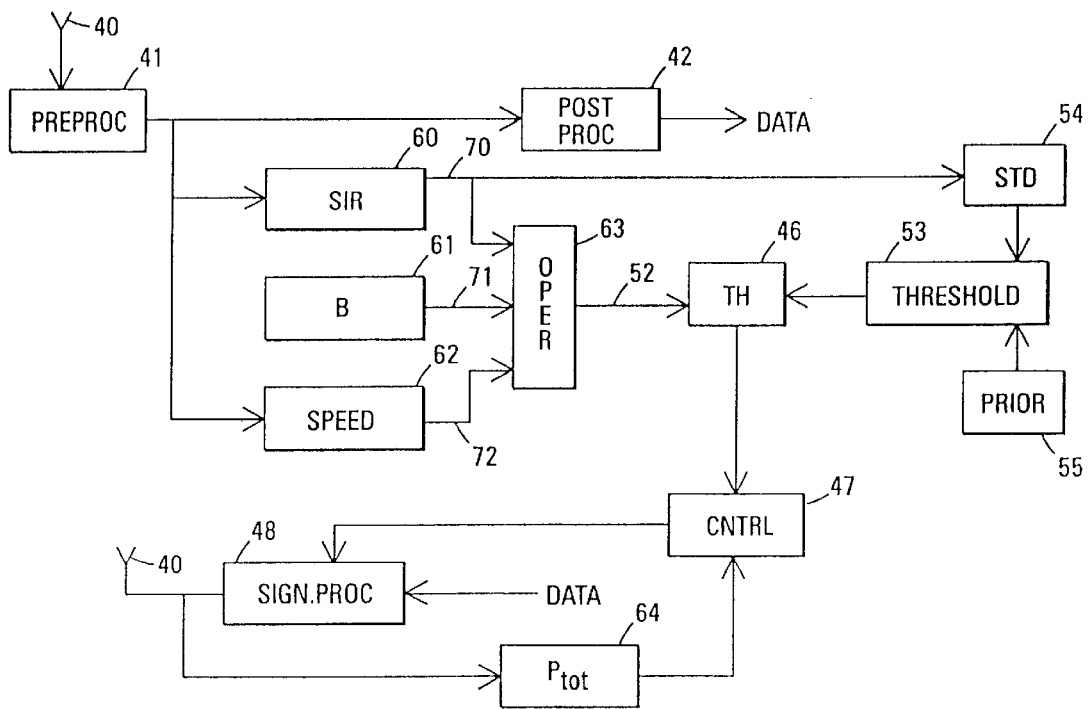

FIG. 4 shows a block diagram which implements the solution of the invention somewhat differently than the solution in FIG. 3. The solution comprises an antenna 40, pre-processing means 41, post-processing means 42, signal-to-interference ratio means 60, frequency band means 61, data transmission rate means 62, multiplication means 63, measuring means for total signal strength 64, threshold means 46, control means 47, transmission means 48 and threshold value means 53 in which a threshold value is stored. The solution functions in other respects substantially similarly as the solution in FIG. 3, but regarding the means 60-63 the function is different. The signal-to-interference ratio means 60 forms a signal-to-interference ratio 70 being the objective and applicable to the operational circumstances. The signal-to-interference ratio 70 is signalled onwards to means 54 and 63. The frequency band means 61 possesses information on a bandwidth BW 71 used. The signal bandwidth is typically predetermined. Information on a signal data transmission DS 72 is formed, or it is stored in the means 62. The data transmission rate is typically predetermined but can also be detected from the signal by measuring in the data transmission rate means 62. In the multiplication means 63 the signal-to-interference ratio 70 is proportioned, for example, in accordance with formula (2) by the bandwidth 71 (BW) and the data transmission rate 72 (DS) to a load result 52 and by comparing the result 52 with the predetermined threshold value 53 in the threshold means 46, the threshold means 46 can inform the control means 47 whether the data transmission needs to be changed. Using means 54 and 55 the magnitude of the threshold value 53 is changed according to the method of the invention. In a conventional solution means 40, 41, 42, 47, 48, 60 and 64 are located at the subscriber terminal or the base station. Means 46, 53, 54, 55 and 63 are located at the base station and/or the base station controller. The location of means 61 and 62 can in a conventional solution vary, and be at the subscriber terminal, the base station and the base station controller. However, the location is not essential for the invention.

The solutions of the invention can be implemented particularly regarding digital signal processing, for example, with ASIC or VLSI circuits. The functions to be performed are preferably implemented as programs based on microprocessor technology.

Even though the invention has above been described with reference to the example of the accompanying drawings, it is obvious that the invention is not restricted to it but can be modified in various ways within the scope of the inventive idea disclosed in the attached claims.

What is claimed is:

1. A method for load control, the method being used in a radio system comprising at least one base station and a subscriber terminal which communicate with each other by transmitting and receiving signals representing desired signals and interferences, comprising:

forming a combined signal strength of one or more desired signals;

forming a combined total strength of the interferences and one or more desired signals;

forming a load result measuring the load by comparing the signal strength and the total strength;

comparing the load result with a threshold value, which is a predetermined measure for the highest load level allowed, whereby, when the load result and the threshold value substantially differ from one another; and wherein the load is balanced by changing the telecommunication rate.

2. A method as claimed in claim 1, further comprising:

reducing the data transmission rate when the load result is substantially higher than the threshold value; or increasing the data transmission rate when the load result is substantially smaller than the threshold value.

3. A method as claimed in claim 1, further comprising, when the signals comprise digital symbols, reducing the data transmission rate in the connections having the highest energy per symbol, and increasing the data transmission rate in the connections having the smallest energy per symbol.

4. A method as claimed in claim 1, further comprising avoiding the establishment of new connections when the load result is substantially higher than what is allowed according to the threshold value until the load result is again substantially smaller than the threshold value.

5. A method as claimed in claim 4, wherein forming the load result comprises forming the load result repeatedly and by reducing the threshold value by a value based on a mean deviation of the previous load results when the load result is compared with the threshold value.

6. A method as claimed in claim 4, further comprising prioritizing a connection performing handover by adding a handover parameter to the threshold value.

7. A method as claimed in claim 4, wherein a base station comprises measuring means for total signal strength, and whereby the establishment of a new connection is avoided if the combined strength of a desired signal and a pilot signal is higher than a predetermined minimum.

8. A method as claimed in claim 1, wherein the telecommunication rates are increased or reduced in the area of each cell irrespective of one another when the radio system comprises cells.

9. A radio system comprising at least one base station and a subscriber terminal which comprise at least one transceiver and which are arranged to communicate with one another by transmitting and receiving signals which are desired signals and/or interferences, comprising:

signal means to form a signal strength of one or more desired signals;

total strength means to form a combined total strength for both interferences and one or more desired signals;

comparing means to form a load result by comparing the signal strength and the total strength;

threshold means to compare the load result with a threshold value, which is a predetermined measure for the highest load level allowed, and when the load result and the threshold value substantially differ from one another on the basis of the comparison, the radio system is arranged to balance the load by changing the telecommunication rate.

10. A radio system as claimed in claim 9, wherein the radio system is further arranged to reduce the data transmission rate when the load result is higher than the threshold value; or to increase the data transmission rate when the load result is smaller than the threshold value.

11. A radio system as claimed in claim 10, wherein the load result is continuously formed and the threshold value is reduced by a value based on the mean deviation of the previous load results when the load result is compared with the threshold value.

12. A radio system as claimed in claim 10, wherein the radio system is further arranged to prioritize a connection performing handover by adding a handover parameter to the threshold value.

13. A radio system as claimed in claim 10, further comprising a base station comprising a measuring means for total signal strength, and wherein the radio system is arranged to avoid the establishment of a new connection if the combined strength of a desired signal and a pilot signal is higher than a predetermined minimum.

14. A radio system as claimed in claim 9, wherein, when the signals comprise digital symbols, the radio system is arranged to reduce the data transmission rates particularly in the connections having the highest energy per symbol, and to increase the data transmission rate particularly in the connections having the smallest energy per symbol.

15. A radio system as claimed in claim 9, wherein the radio system is further arranged to avoid the establishment of new connections before the load result is again substantially smaller than the threshold value.

16. A radio system as claimed in claim 9, wherein the radio system is arranged to increase or reduce the data transmission rate separately in the area of each cell when the radio system comprises cells.

17. A method for load control, the method being used in a radio system comprising at least one base station and a subscriber terminal which communicate with each other by transmitting and receiving signals representing desired signals and interferences, the method comprising:
- forming a combined signal strength of at least one desired signal;
- forming a combined total strength of the interferences and at least one desired signal;
- forming a load result measuring the load by comparing the signal strength and the total strength;
- comparing the load result with a threshold value, which is a predetermined measure for the highest load level allowed; and
- keeping the load result constant by changing the telecommunication rate.

18. A radio system comprising at least one base station and a subscriber terminal which comprise at least one transceiver and which are arranged to communicate with one another by transmitting and receiving signals which are desired signals and/or interferences, the base station comprising:
- signal means to form a signal strength of one or more desired signals;
- total strength means to form a combined total strength for both interferences and one or more desired signals;
- comparing means to form a load result by comparing the signal strength and the total strength;
- threshold means to compare the load result with a threshold value, which is a predetermined measure for the highest load level allowed, wherein the base station is arranged to keep the load result constant by changing the telecommunication rate.

* * * * *